(12) United States Patent
Sunkara et al.

(10) Patent No.: US 11,486,432 B2
(45) Date of Patent: Nov. 1, 2022

(54) ANCHOR ASSEMBLY WITH TOGGLE

(71) Applicant: THE HILLMAN GROUP, INC., Cincinnati, OH (US)

(72) Inventors: Hari R P Sunkara, Tempe, AZ (US); Beesham Mahadeo, Toronto (CA)

(73) Assignee: THE HILLMAN GROUP, INC., Cincinnati, OH (US)

( * ) Notice: Subject to any disclaimer, the term of this patent is extended or adjusted under 35 U.S.C. 154(b) by 191 days.

(21) Appl. No.: 16/694,234

(22) Filed: Nov. 25, 2019

(65) Prior Publication Data

US 2020/0173479 A1    Jun. 4, 2020

Related U.S. Application Data

(60) Provisional application No. 62/772,946, filed on Nov. 29, 2018.

(51) Int. Cl.
*F16B 21/00* (2006.01)
*F16B 13/00* (2006.01)

(52) U.S. Cl.
CPC ................... *F16B 13/003* (2013.01)

(58) Field of Classification Search
CPC .................................................. F16B 13/003
USPC .......................................... 411/345, 346, 340
See application file for complete search history.

(56) References Cited

U.S. PATENT DOCUMENTS

| | | | |
|---|---|---|---|
| 549,069 A | 10/1895 | Lever | |
| 918,063 A | 4/1909 | Klahre | |
| 991,427 A | 5/1911 | Clements | |
| 1,084,284 A | 1/1914 | Merrill | |
| 1,145,423 A | 7/1915 | Joseph | |
| 1,352,919 A | 9/1920 | Mahoney | |
| 1,373,188 A | 3/1921 | Goewey | |
| 1,386,202 A | 8/1921 | Peterson | |
| 1,409,626 A | 3/1922 | Walther | |
| 1,516,242 A | 11/1924 | Peirce | |
| 1,733,693 A | 10/1929 | Porter | |
| 1,738,133 A | 12/1929 | Anderson | |
| 2,203,146 A | 6/1940 | Hexdall | |
| 2,519,511 A | 8/1950 | Stelter | |
| 2,532,040 A | 11/1950 | Seely | |
| 2,916,235 A * | 12/1959 | Nagel | F16B 13/0808 248/497 |
| 3,168,850 A * | 2/1965 | Tennican | F16B 13/0808 411/342 |
| 3,248,994 A | 5/1966 | Mortensen | |

(Continued)

FOREIGN PATENT DOCUMENTS

| | | |
|---|---|---|
| WO | WO2017055060 | 4/2017 |
| WO | WO2017177256 | 10/2017 |
| WO | WO2018102902 | 6/2018 |

OTHER PUBLICATIONS

U.S. Appl. No. 16/694,227.

*Primary Examiner* — Gary W Estremsky
(74) *Attorney, Agent, or Firm* — Thompson Hine LLP

(57) ABSTRACT

An anchor assembly for wallboard installation includes a toggle body that is elongated along a toggle body axis, the toggle body including opposed first and second arms and a slot between the first and second arms. A toggle nut is elongated along a toggle nut axis, the toggle nut mounted in the slot of the toggle body for pivot between an install orientation seated in the slot and an anchoring orientation protruding from the slot.

18 Claims, 25 Drawing Sheets

(56) References Cited

U.S. PATENT DOCUMENTS

| | | | | |
|---|---|---|---|---|
| 3,605,547 | A | 9/1971 | Millet | |
| 3,673,910 | A | 7/1972 | Collister | |
| 3,707,898 | A * | 1/1973 | Holly | F16B 13/0808 411/344 |
| 3,748,697 | A | 7/1973 | Marchese | |
| 3,861,267 | A | 1/1975 | Collister | |
| 3,872,768 | A * | 3/1975 | Ernst | F16B 13/0808 411/345 |
| 3,980,329 | A | 9/1976 | Coe | |
| 4,075,924 | A | 2/1978 | McSherry | |
| 4,196,883 | A | 4/1980 | Einhorn | |
| 4,283,986 | A | 8/1981 | Peterson | |
| 4,285,264 | A | 8/1981 | Einhorn | |
| 4,398,855 | A | 8/1983 | Hultquist | |
| 4,502,826 | A | 3/1985 | Fafard | |
| 5,046,693 | A | 9/1991 | Browne | |
| 5,067,864 | A * | 11/1991 | Dewey | F16B 13/002 411/344 |
| 5,322,401 | A * | 6/1994 | Vernet | B29C 45/0017 411/344 |
| 5,749,687 | A * | 5/1998 | Kilgore, III | F16B 13/0808 411/29 |
| 5,876,169 | A * | 3/1999 | Wrigley | F16B 13/002 411/344 |
| 6,161,999 | A | 12/2000 | Kaye | |
| 6,213,701 | B1 | 4/2001 | Ukai | |
| 6,250,865 | B1 * | 6/2001 | McSherry | F16B 13/0808 411/29 |
| 6,491,486 | B1 | 12/2002 | Daly | |
| 6,679,664 | B2 | 1/2004 | Ikuta | |
| 6,821,069 | B2 | 11/2004 | Ikuta | |
| 6,884,012 | B2 | 4/2005 | Panasik | |
| 7,547,171 | B2 * | 6/2009 | McDuff | A47G 1/20 411/400 |
| 7,611,316 | B2 * | 11/2009 | Panasik | F16B 13/0808 411/340 |
| D605,933 | S | 12/2009 | Gaudron | |
| 7,736,108 | B1 * | 6/2010 | Bruce | F16B 13/0808 411/340 |
| 7,828,501 | B2 | 11/2010 | Bauer | |
| 7,955,392 | B2 * | 6/2011 | Dewey | A61B 17/7068 623/17.16 |
| 8,011,080 | B2 | 9/2011 | Brown | |
| D651,890 | S | 1/2012 | Gaudron | |
| 8,128,329 | B2 | 3/2012 | Pilon | |
| 8,235,635 | B1 | 8/2012 | Brown | |
| 8,303,224 | B2 | 11/2012 | McDuff | |
| 8,388,290 | B2 | 3/2013 | Wiggins | |
| 8,444,358 | B2 | 5/2013 | Gaudron | |
| 8,449,236 | B2 * | 5/2013 | McDuff | F16B 13/0808 411/344 |
| 8,568,075 | B2 | 10/2013 | Gaudron | |
| 8,573,913 | B2 | 11/2013 | McDuff | |
| 8,821,094 | B2 | 9/2014 | McDuff | |
| 8,858,143 | B2 | 10/2014 | Gaudron | |
| 9,394,932 | B2 | 7/2016 | McDuff | |
| 9,447,556 | B2 | 9/2016 | Daniel | |
| 9,587,661 | B2 | 3/2017 | McDuff | |
| 2004/0170486 | A1 | 9/2004 | DeMeo | |
| 2005/0117996 | A1 | 6/2005 | Lemire | |
| 2006/0088399 | A1 | 4/2006 | DeMeo | |
| 2009/0053007 | A1 | 2/2009 | Rafaeli | |
| 2009/0208310 | A1 | 8/2009 | Ikuta | |
| 2009/0249738 | A1 | 10/2009 | Brereton | |
| 2011/0164941 | A1 | 7/2011 | Snead | |
| 2011/0262235 | A1 | 10/2011 | Garfield | |
| 2014/0199132 | A1 | 7/2014 | McDuff | |
| 2015/0043989 | A1 | 2/2015 | Lind | |
| 2016/0131304 | A1 | 5/2016 | Roberts | |
| 2017/0102020 | A1 | 4/2017 | McDuff | |
| 2017/0307000 | A1 | 10/2017 | Daly | |
| 2017/0314600 | A1 | 11/2017 | Daly | |
| 2018/0073538 | A1 | 3/2018 | Daly | |

\* cited by examiner

ANCHOR ASSEMBLY WITH TOGGLE

TECHNICAL FIELD

This application relates generally to wall anchors for drywall and other types of wallboard, and more particularly, to an anchor assembly with a toggle body and a toggle nut.

BACKGROUND

A variety of types of wall anchors are known, including toggles in which a toggle body includes a toggle nut that pivots on the toggle body. Improvements in both the manufacturability and performance of such toggle anchors is continually sought.

SUMMARY

In one aspect, an anchor assembly for wallboard installation includes a toggle body that is elongated along a toggle body axis, the toggle body including opposed first and second arms and a slot between the first and second arms. A toggle nut is elongated along a toggle nut axis, the toggle nut mounted in the slot of the toggle body for pivot between an install orientation seated in the slot and an anchoring orientation protruding from the slot. The toggle body includes a connecting leg along a lower portion of the slot and that extends between the first and second arms, wherein the toggle nut includes a latch finger that engages with the connecting leg, when the toggle nut is in the install orientation, to releasably retain the toggle nut in the install orientation.

In another aspect, an anchor assembly for wallboard installation includes a toggle body that is elongated along a toggle body axis, the toggle body including opposed first and second arms and a slot between the first and second arms. A toggle nut is elongated along a toggle nut axis, the toggle nut mounted in the slot of the toggle body for pivot between an install orientation seated in the slot and an anchoring orientation protruding from the slot. The toggle body includes a connecting leg along a lower portion of the slot and that extends between the first and second arms, wherein the toggle nut includes a latch finger that engages with the connecting leg, when the toggle nut is in the install orientation, to releasably retain the toggle nut in the install orientation. The first arm includes a first recessed upper edge portion and the second arm includes a second recessed upper edge portion, wherein the toggle nut includes a first side flange and a second side flange, wherein, when the toggle nut is in the install orientation, the first side flange seats within the first recessed upper edge portion and the second side flange seats within the second recessed upper edge portion. The toggle body includes a forward wall boring end formed by a positioning tip and a set of blade projections disposed about the positioning tip, wherein each blade projection includes a forward cutting edge, wherein the positioning tip is formed by a body with a convex surface portion and a concave surface portion.

In another aspect, an anchor assembly for wallboard installation includes a toggle body that is elongated along a toggle body axis, the toggle body including opposed first and second arms and a slot between the first and second arms. A toggle nut is elongated along a toggle nut axis, the toggle nut mounted in the slot of the toggle body for pivot between an install orientation and an anchoring orientation. In the install orientation, the toggle nut axis is substantially parallel to the toggle body axis. In the anchoring orientation, the toggle nut axis is substantially perpendicular to the toggle body axis.

In another aspect, an anchor assembly for wallboard installation includes a toggle body that is elongated along a toggle body axis, the toggle body including opposed first and second arms and a slot between the first and second arms. A toggle nut is elongated along a toggle nut axis, the toggle nut mounted in the slot of the toggle body for pivot between an install orientation seated in the slot and an anchoring orientation protruding from the slot. The anchor assembly further includes one or more features selected from the following:

(i) a pivot connection between the toggle nut and the toggle body, the pivot connection formed at least in part by a first pivot bar and a first pivot recess, wherein the first pivot bar projects into the slot from an inner side of the first arm of the toggle body, wherein the first pivot recess is defined in a first side surface of the toggle nut;

(ii) the pivot connection also formed at least in part by a second pivot bar and a second pivot recess, wherein the second pivot bar projects into the slot from an inner side of the second arm of the toggle body, wherein the second pivot recess is defined in a second side surface of the toggle nut;

(iii) the first arm includes a first recessed upper edge portion and the second arm includes a second recessed upper edge portion, wherein the toggle nut includes a first side flange and a second side flange, wherein, when the toggle nut is in the install orientation, the first side flange seats within the first recessed upper edge portion and the second side flange seats within the second recessed upper edge portion;

(iv) the toggle nut includes a forwardly extending flange with a plurality of teeth;

(v) the toggle body includes a connecting leg along a lower portion of the slot and that extends between the first and second arms, wherein the toggle nut includes a latch finger that engages with the connecting leg, when the toggle nut is in the install orientation, to releasably retain the toggle nut in the install orientation;

(vi) the toggle body includes a driving end and a wall boring end, wherein, when the toggle nut is in the install orientation, the latch finger includes a latch segment that protrudes rearwardly toward the driving end of the toggle body and the connecting leg includes a latch step that protrudes forwardly toward the wall boring end of the toggle body, and the latch segment is captured at least partly beneath the latch step;

(vii) the toggle body includes a driving end and a wall boring end, wherein the first arm of the toggle body includes a first guide rail projecting into the slot and the second arm of the toggle body includes a second guide rail projecting into the slot, wherein the toggle nut includes a first slide projection for engaging with a top of the first guide rail when the toggle nut is in the anchor orientation and moves toward the driving end of the toggle body, wherein the toggle nut includes a second slide projection for engaging with a top of the second guide rail when the toggle nut is in the anchor orientation and moves toward the driving end of the toggle body;

(viii) the first slide projection includes a convex surface that engages the first guide rail and the second slide projection includes a second convex surface that engages the second guide rail;

(ix) the toggle body includes a forward wall boring end formed by a positioning tip and a set of blade projections disposed about the positioning tip, wherein each blade projection includes a forward cutting edge, wherein the positioning tip is formed by a body with a convex surface portion and a concave surface portion;

(x) the toggle body includes a forward wall boring end formed by a positioning tip and first, second and third blade projections disposed about the positioning tip, wherein the first blade projection is formed at a forward end of the first arm, the second blade projection is formed at a forward end of the second arm, and the third blade projection extends forwardly from a connecting leg that extends between the first arm and the second arm;

(xi) the positioning tip extends forwardly from the connecting leg and is not connected to the first blade projection or the second blade projection.

The details of one or more embodiments are set forth in the accompanying drawings and the description below. Other features, objects, and advantages will be apparent from the description and drawings, and from the claims.

DETAILED DESCRIPTION

Figure 1:
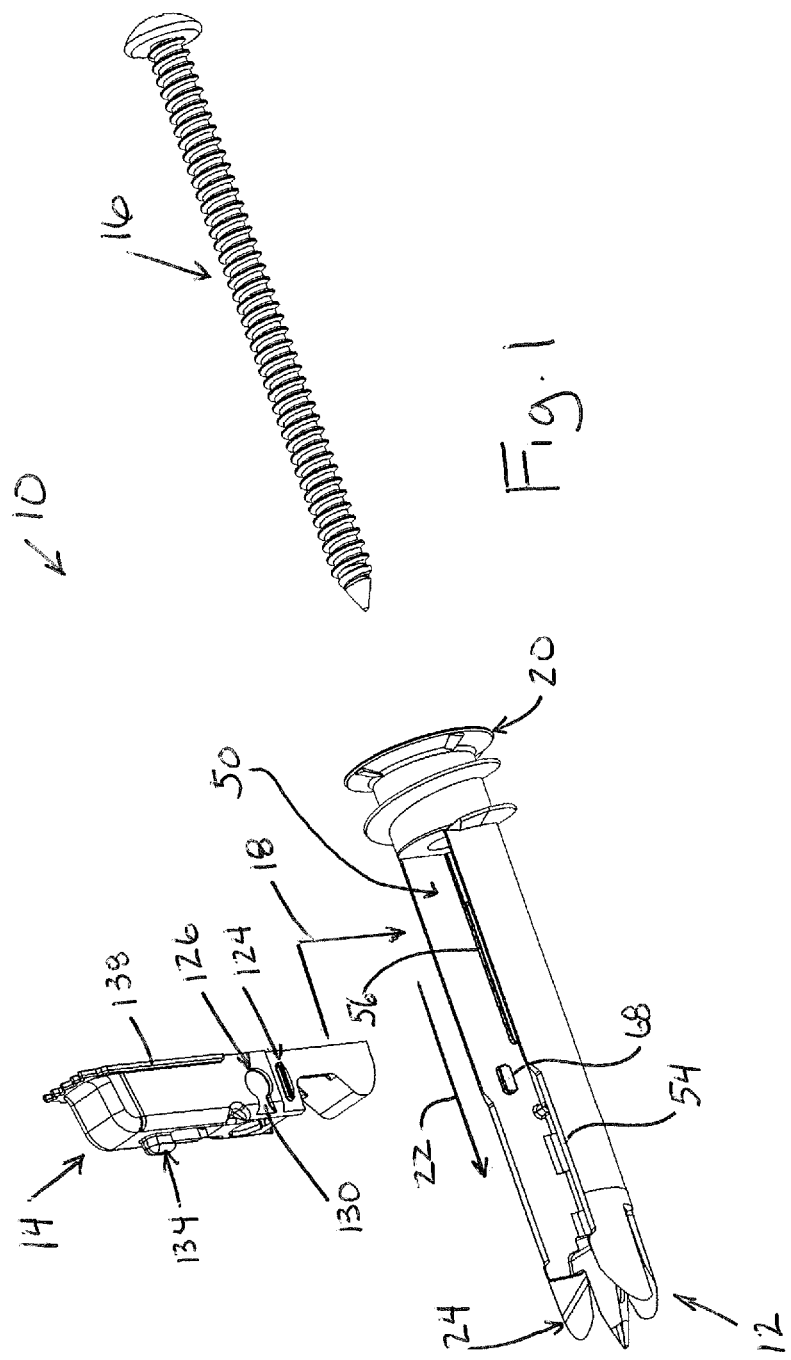
FIG. 1 shows an exploded perspective view of one embodiment of a toggle anchor assembly.

In the drawings and description of various anchor embodiments below, the term wallboard is generally used to refer to the most common wallboard such as drywall, but it is recognized that the anchor components could be suitable for any other friable wallboard material, such as dense corks or foams or other materials that can crumble. Accordingly, the term wallboard as used herein is intended to broadly encompass, for example, both typical drywall (aka plasterboard and gypsum board) and such other friable wallboard materials.

Referring to FIGS. 1-22, in one embodiment a toggle anchor 10 includes two main portions, specifically an elongated toggle body 12 and an elongated toggle nut 14, as well as a screw 16. In one example, the toggle body 12 is formed of a die cast metal material and the toggle nut 14 is formed of a die cast metal material. However, variations are possible, such as the toggle body being of plastic and the toggle nut being of metal.

Figure 2:
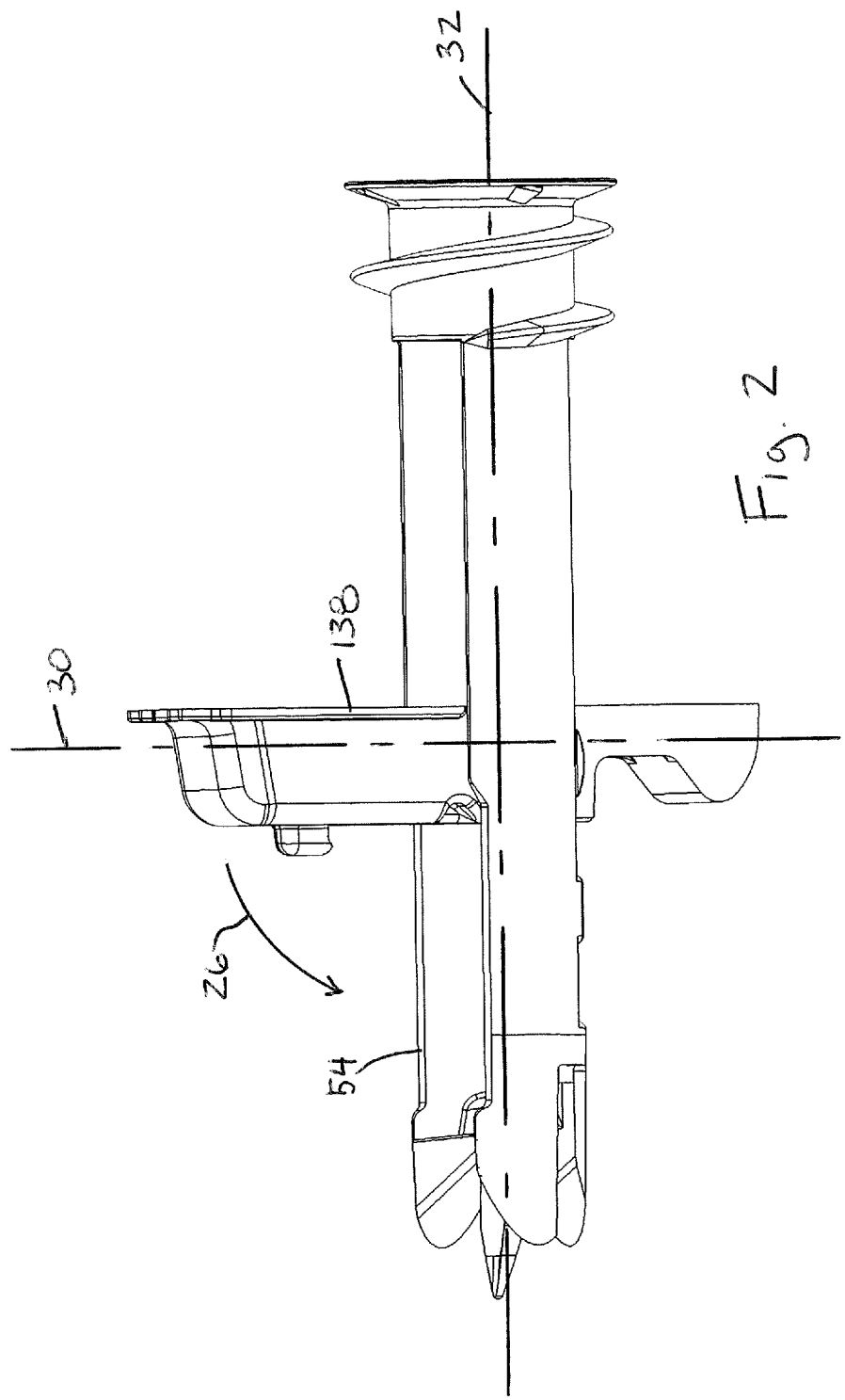
FIG. 2 shows an assembled perspective view of the anchor assembly with toggle nut in an anchoring orientation.

Per FIG. 1, the toggle nut 14 is loadable into the toggle body 12 by moving the toggle nut downward into a slot within the toggle body, per arrow 18, near the driving end 20 of the toggle body. The toggle nut 14 is then moved within the slot per arrow 22 toward the wall boring end 24 of the toggle body until the toggle body reaches its mount position shown in FIG. 2. The orientation of FIG. 2 represents the anchoring orientation of the toggle anchor, in which the lengthwise axis 30 of the toggle nut 14 runs substantially perpendicular to the lengthwise axis 32 of the toggle body 12. The toggle nut 14 can be pivoted downward per arrow 26 to an install orientation, shown in FIG. 3, in which the lengthwise axis 30 of the toggle nut runs substantially parallel to the lengthwise axis 32 of the toggle body. The install orientation is the orientation of the toggle anchor used for wall penetration.

Figure 4:
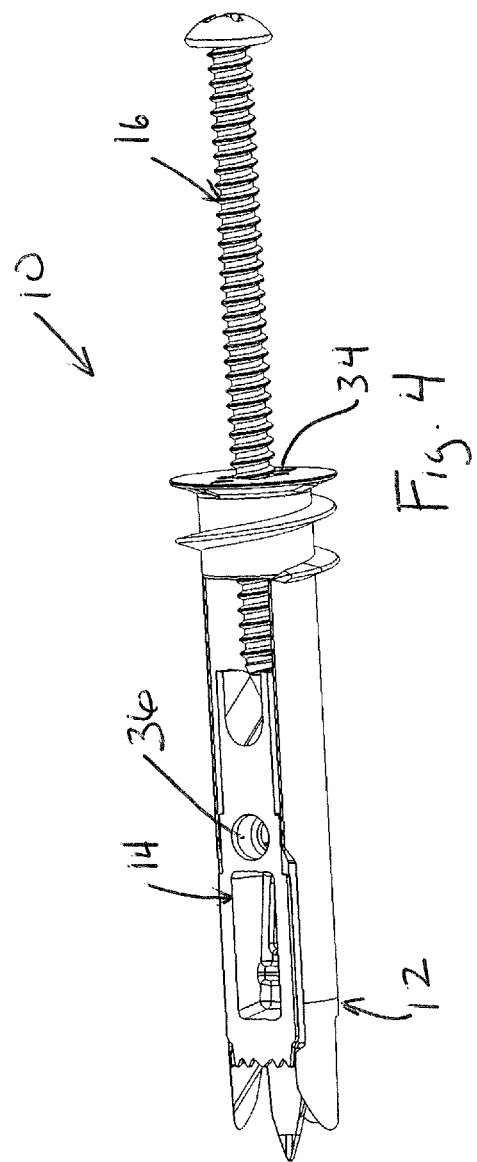
FIG. 4 shows a perspective view of fastener engagement with the toggle body, prior to toggle nut pivot.
Figure 5:
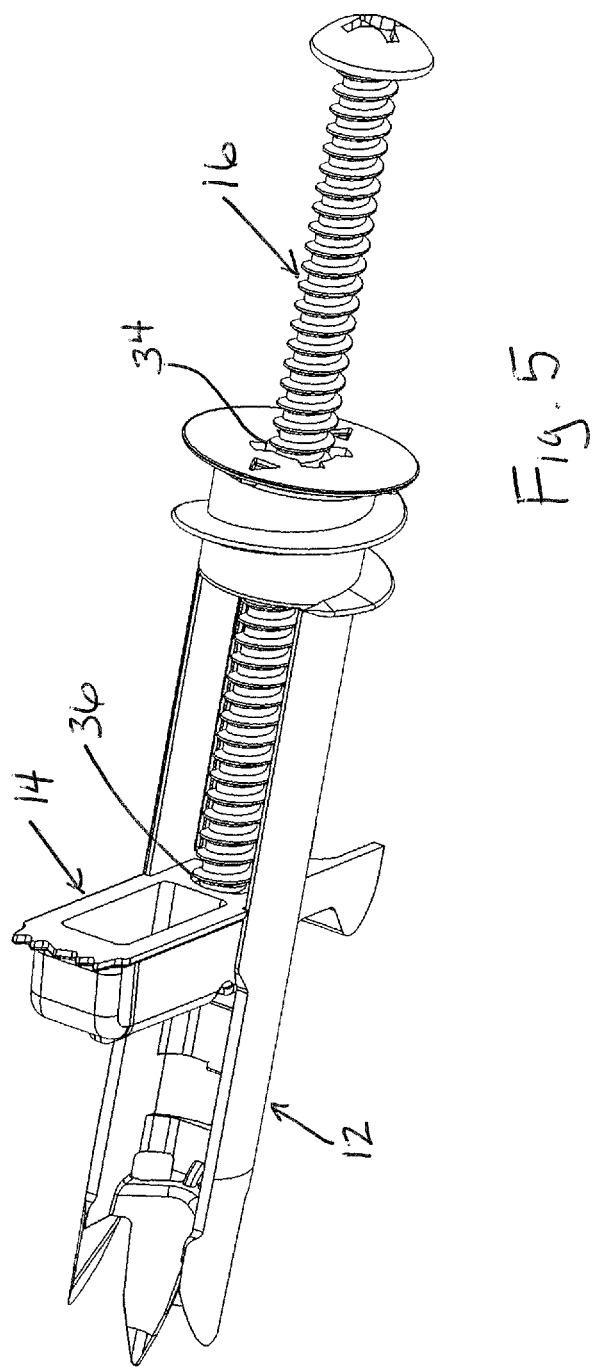
FIG. 5 an assembled perspective view of the anchor assembly, with the toggle nut pivoted into an anchoring orientation.
Figure 6:
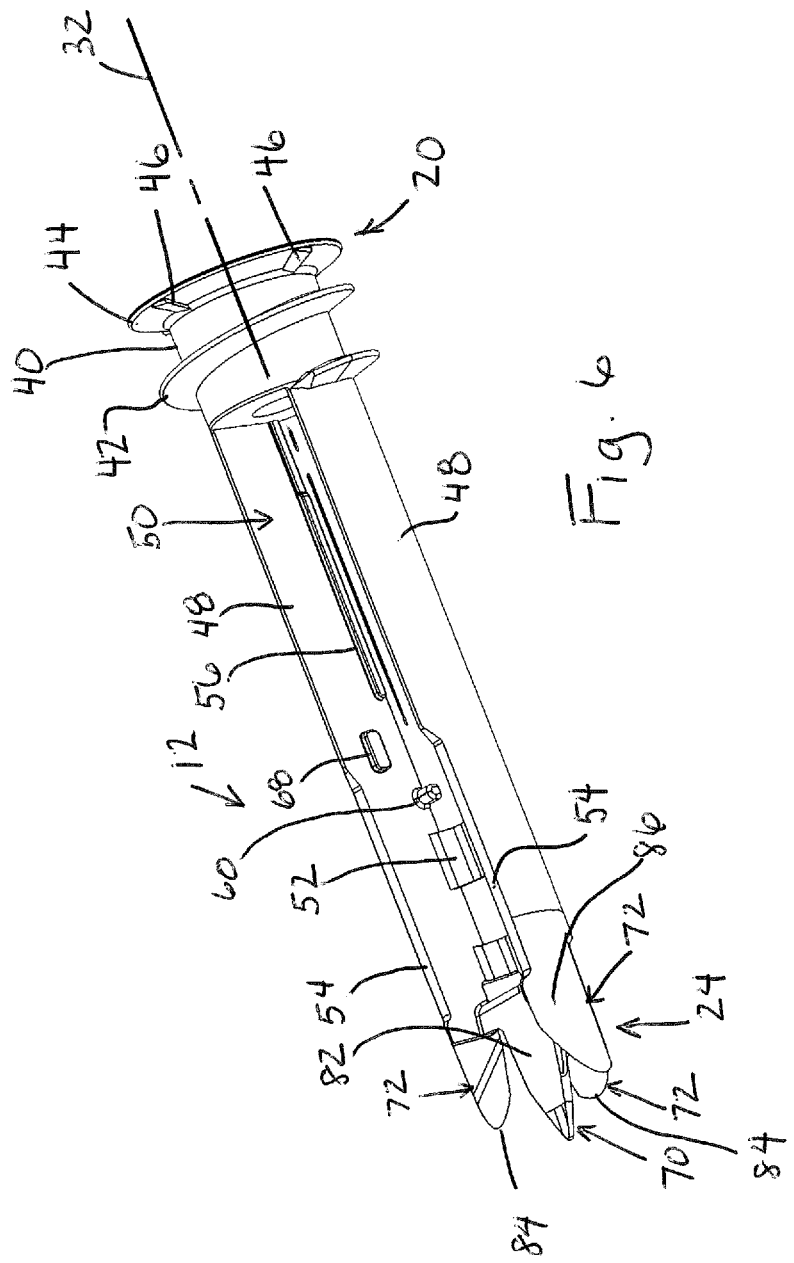
FIGS. 6-8 show perspective views of the toggle body.

The toggle anchor 10 can be reoriented from the install orientation to the anchoring orientation when the screw 16 is moved into an end opening 34 at the driving end of the toggle body and then along the toggle body so that the screw engages the toggle nut 14 per FIG. 4, causing the toggle nut 14 to flip to the anchoring orientation. In the anchoring orientation, a threaded opening 36 of the toggle nut 14 aligns with the screw 16 so that the screw will threadedly engaged the toggle nut, as shown in FIG. 5, as the screw passes into and along the toggle body 12.

As seen in FIGS. 6-10, the driving end 20 of the toggle body 12 includes a circular cylindrical body portion 40 with a high thread 42 formed thereon. The high thread 42 will operate to engage with wallboard material to help retain the toggle body to a wall when initially installed. A flange 44, with tapered forward facing or wall facing side, extends outward from the front end of portion 40 and will engage with the front surface of a wall to define the limit of penetration of the anchor. The forward facing side of the flange 44 may include a set of ribs 46 that will bite into the wall surface and therefore reduce the likelihood of the toggle body rotating out of the wall. A pair of arms 48 extend from body portion 40 toward the wall boring end 24. The outer surface portions of the arms are circular cylinder in shape to match the circular cylinder shape of body portion 40. The arms 48 are spaced apart to define a toggle nut receiving slot 50 of the toggle body. The slot 50 is open at both the top and the bottom along a majority of the slot length that extends between the body portion 40 and a connecting leg 52 that runs between the arms 48.

The arms 48 include recessed upper edge portions 54 toward the wall boring end of the toggle body. Internally, each arm 48 includes a respective protruding guide rail 56 that runs from proximate the body portion 40 toward the wall boring end 24. Here, each rail 56 is located along a lower portion of the slot 50 and runs to a distal location that is axially proximate to a short pivot bar 68 that also protrudes from the internal arm surface. One of the arms 48 also includes a stop projection 60 located axially between the connecting leg 52 and the pivot bar 68.

The wall boring end 24 of the toggle body 12 includes a pointed positioning tip 70 that will initially engage the wallboard, and a set of blade projections 72 (here three) disposed about the positioning tip. Two of the blade projections 72 are formed at the distal ends of the arms 48. The third blade projection extends from a connecting leg 74 running between the arms 48. The positioning tip 72 is connected by supports 76 to the ends of the legs and by support 78 to the connecting leg 74 and third blade 72. The positioning tip 70 is formed with a convex surface portion 80 facing the third blade projection, and a concave surface portion 82, where both surface portions taper to reduce in dimension toward the pointed free end of the tip. The positioning tip 70 initially engages a wall surface and, as the toggle body is rotated, the forward cutting edges 84 of the blade projections 72 begin to move into the wall. The blade projections 72 cut a clean hole in the wallboard, resulting in a wallboard hole without any flowering/drywall. The circular segment of wallboard that is cut by the boring end of the toggle body may be retained on the positioning tip 70 after the toggle body fully penetrates the wallboard. Outward facing surface portions 86 of the blade projections 72 are all cylindrical and lie in a common circular cylindrical perimeter that runs parallel to the axis 32 of the toggle body, with the axis 32 positioned at the center of the common circular cylindrical perimeter. For the purpose of facilitating rotation of the toggle body 12 into wallboard, the toggle body includes a drive recess 88 at the driving end 20 of the toggle body. The drive recess 88 is formed in part by the end opening 34, which has radial extensions 90 to form slots for a screwdriver or drive bit.

As seen in FIGS. 11-14, the toggle nut 14 is formed by a body 110 with opposite sides 112, a forward end 114, a rearward end 116 and a bottom 118. The rearward end 116 includes an angled ramp surface 120 that is curved and bounded by sidewall segments 122. Each side 112 includes an elongated slide projection 124 and a pivot recess 126. The slide projection includes a convex surface portion 128 facing toward the rearward end 116. The pivot recess 126 includes an entry throat 130 that leads to a circular main section 132. The bottom side 118 includes a downwardly protruding latch finger 134 with a rim, lip or segment 136 that projects slightly toward the rearward end 116. At the top of each side 112 an outwardly extending flange 138 is provided forward of the axial location of the pivot recess 126. The side flanges 138 extend forward and around the front of the body 110 to form a forward flange 140 with a set of teeth 142 thereon. The teeth 142 are formed by triangular serrations that can bite into a wallboard paper slug that is being cut and minimize dust pressure on the toggle nut, which can help to prevent toggle nut pivot during anchor assembly rotation through the wallboard. The serrated form also helps to support the circular wallboard paper slug and keeps it in position parallel to the front wallboard surface during anchor assembly rotation through the wallboard, which can reduce wallboard fines or dust exiting the front wallboard surface.

Figure 15:
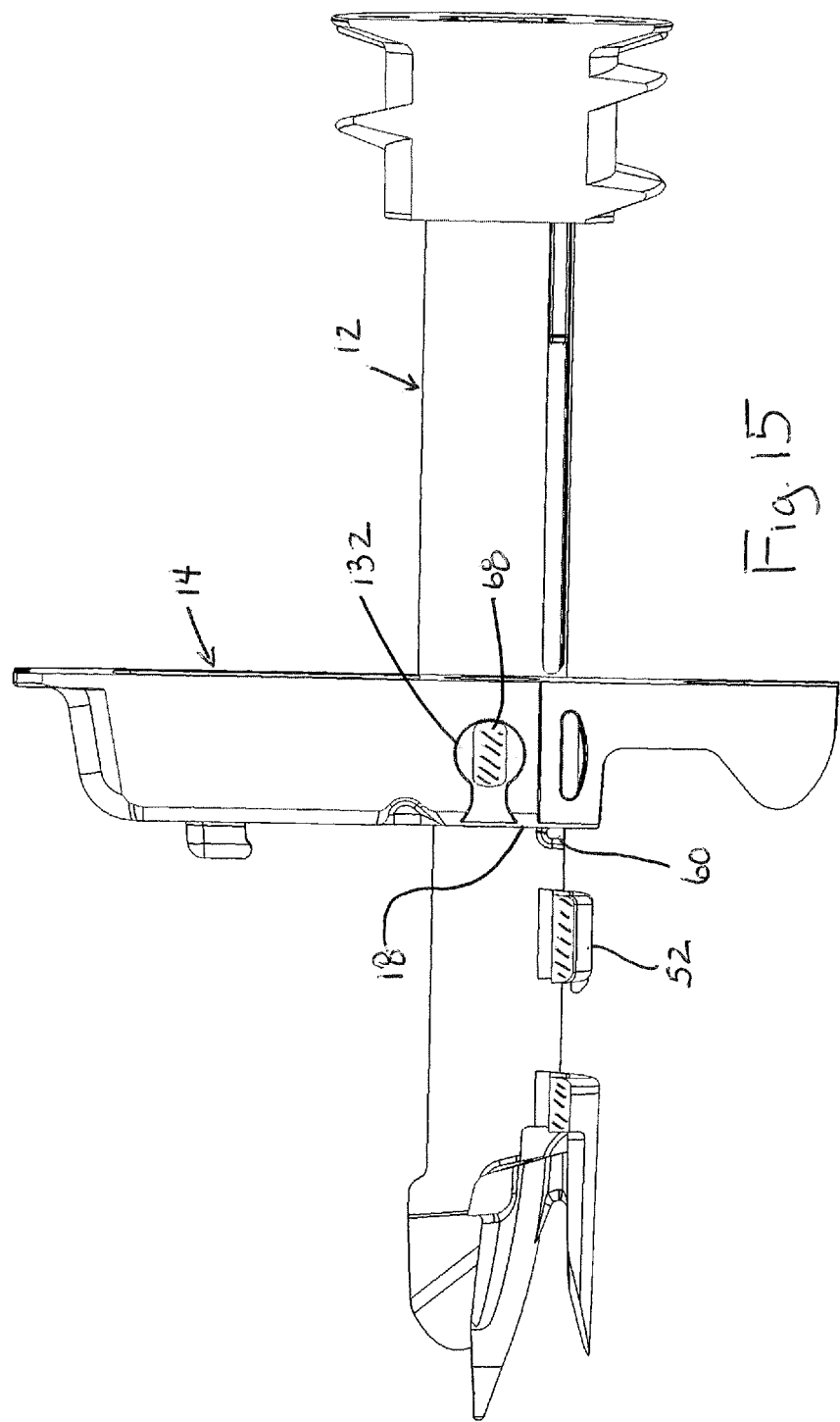
FIG. 15 shows a side cross-section, with the toggle nut in the anchoring orientation.
Figure 16:
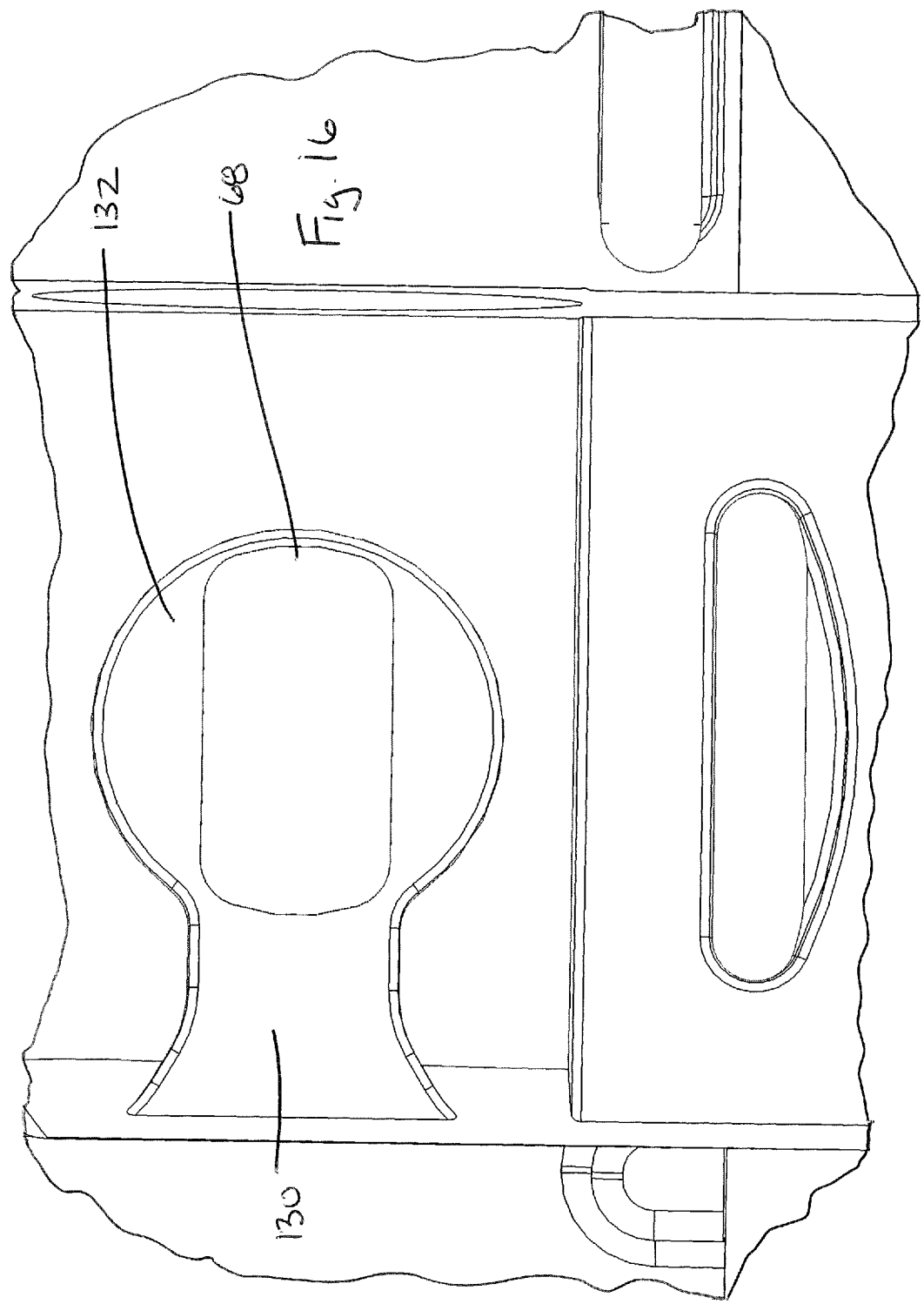
FIG. 16 shows an enlarged view of the pivot connection of FIG. 15.

Referring again to FIG. 1, when the toggle nut is inserted into the toggle body slot 50 per arrow 18, the convex surface portions of the slide projections 124 engage down onto the top surfaces of the guide rails 56, which limits the downward progression of the toggle nut 14 through the slot 50. The toggle nut 14 is then moved toward the boring end 24 per arrow 22, with the slide projections 124 sliding along the top of the guide rails 56 during such movement. The relative positioning of the guide rails 56 and slide projections 124 is such that the entry throat 130 of each pivot recess 126 is aligned with the pivot bar 68, so that the pivot bar will move along the entry throat 130 and into a final position in the main section 132, as seen in FIGS. 15 and 16.

Figure 3:
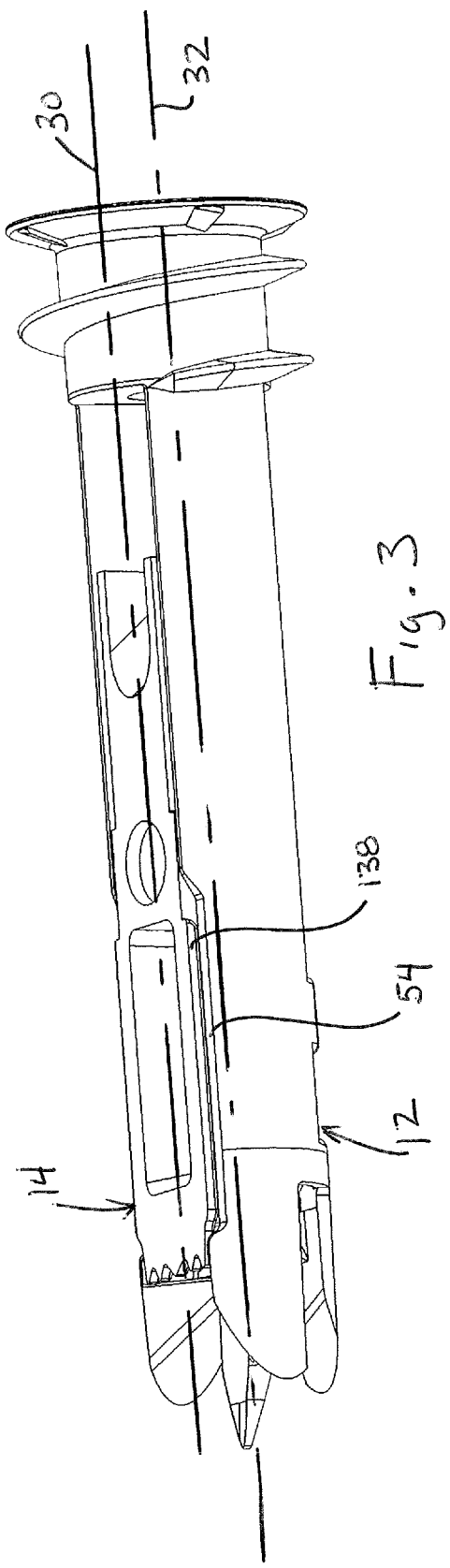
FIG. 3 shows a perspective view of the toggle body and the toggle nut, with toggle nut in an install orientation.
Figure 7:
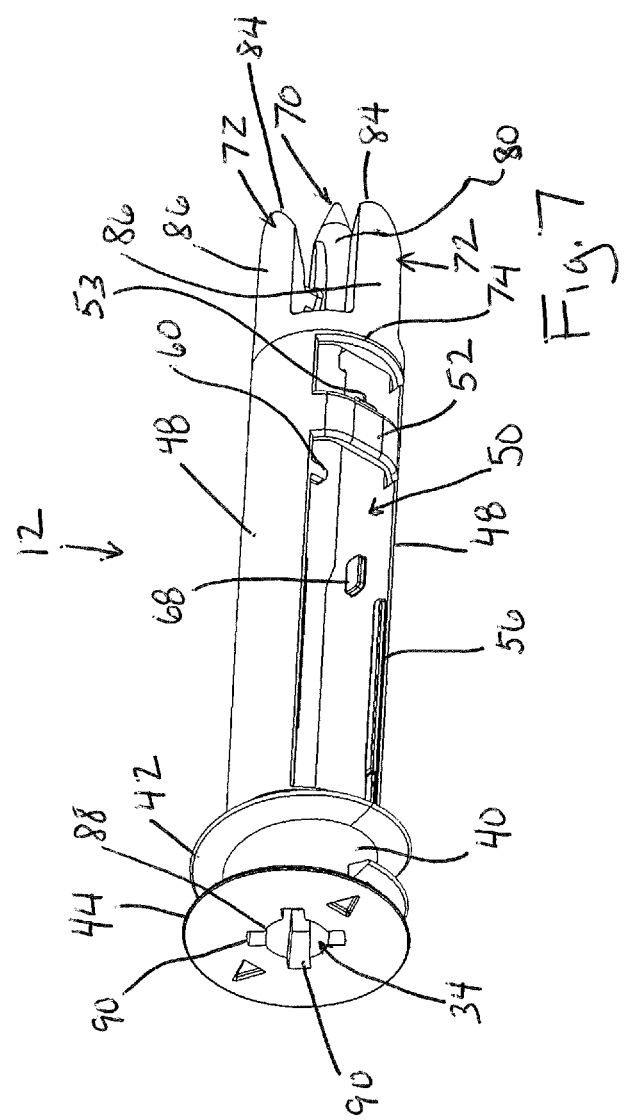
Figure 8:
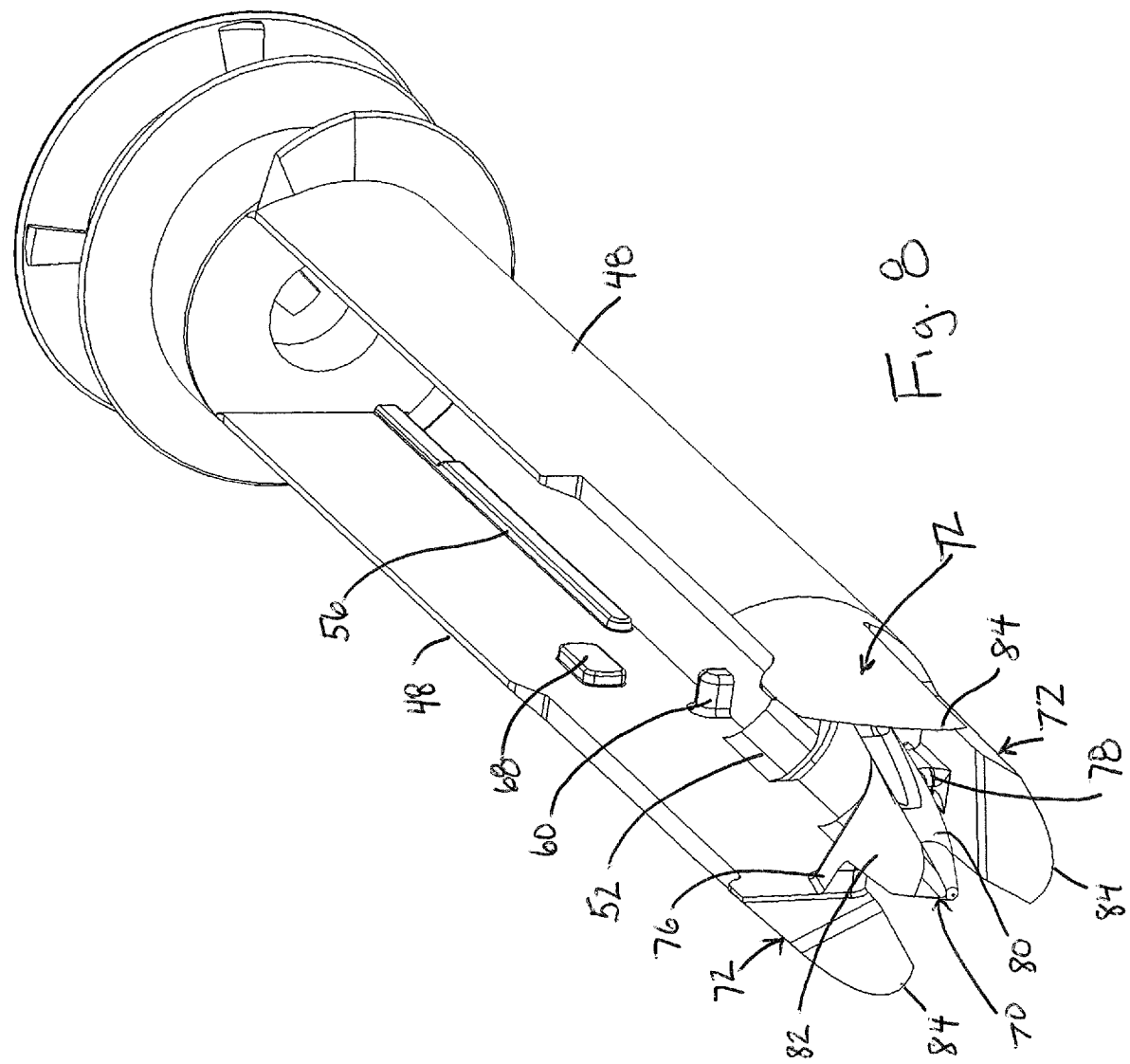
Figure 9:
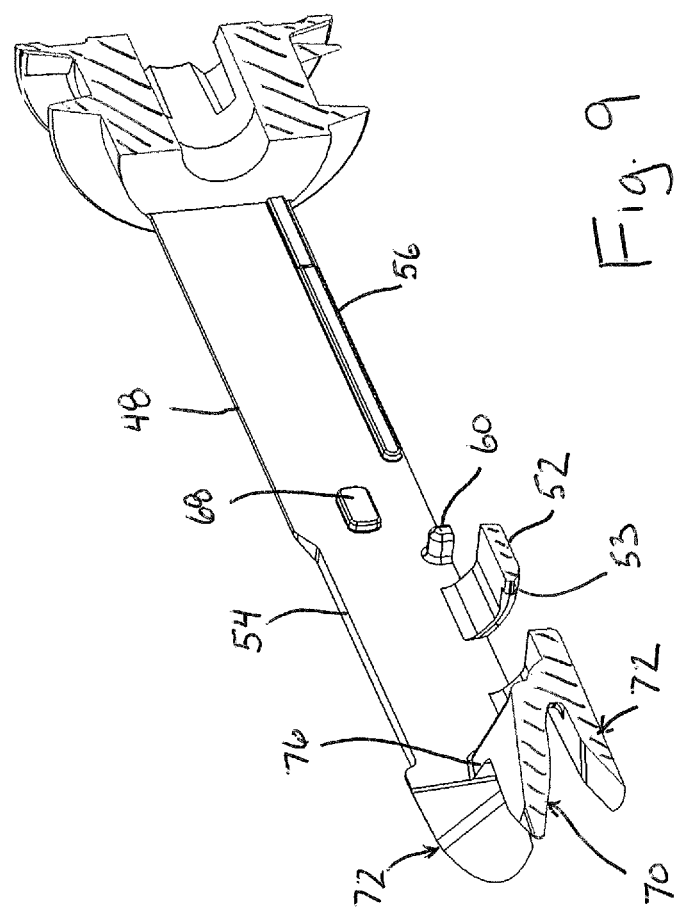
FIGS. 9 and 10 show cross-section views of the toggle body.
Figure 10:
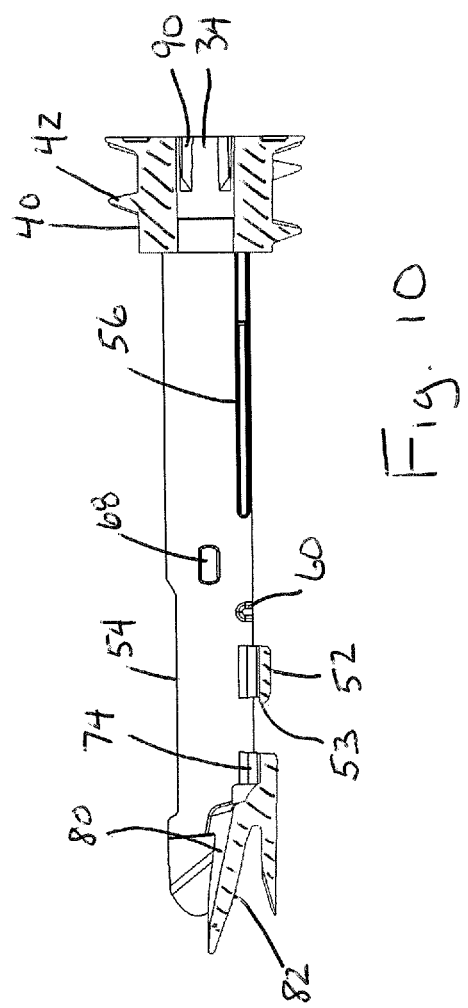
Figure 11:
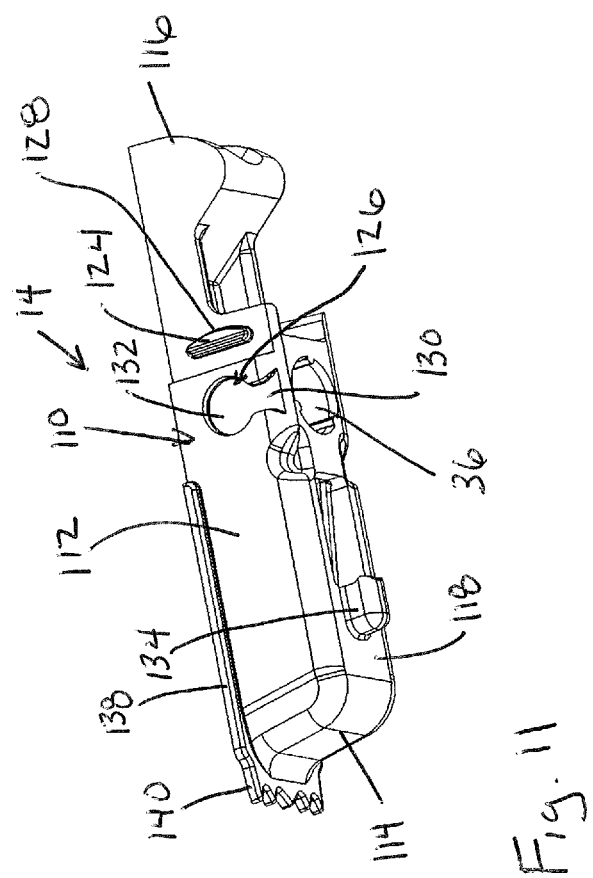
FIGS. 11-14 show perspective views of the toggle nut.
Figure 12:
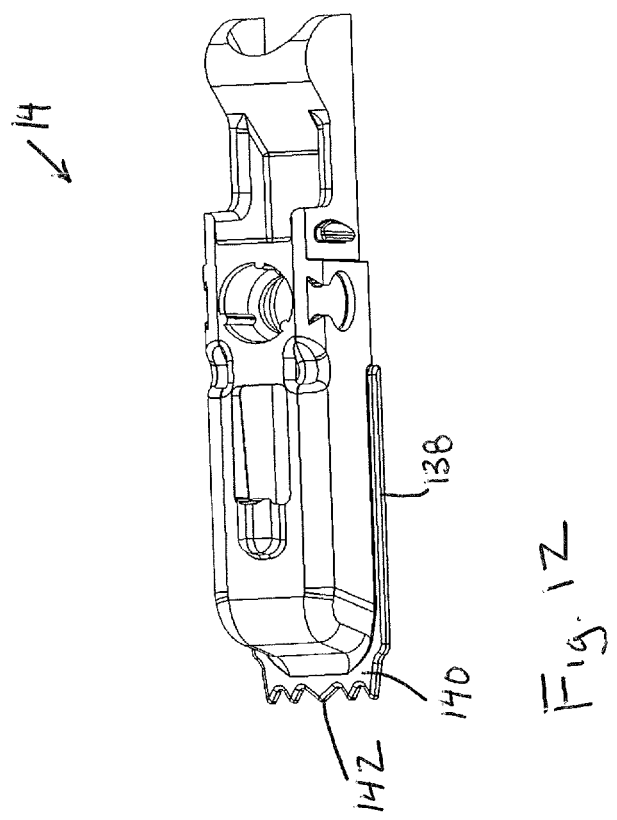
Figure 13:
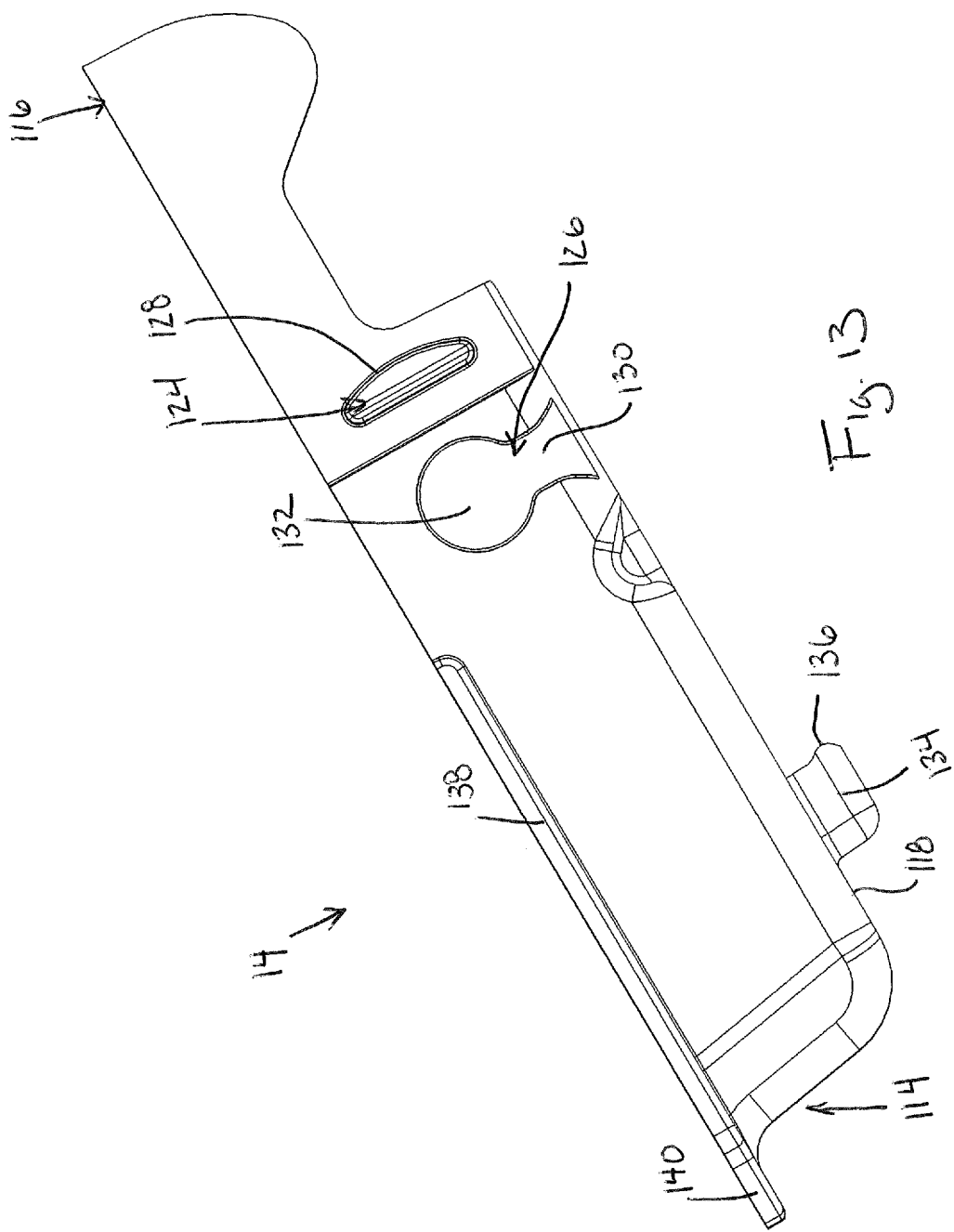
Figure 14:
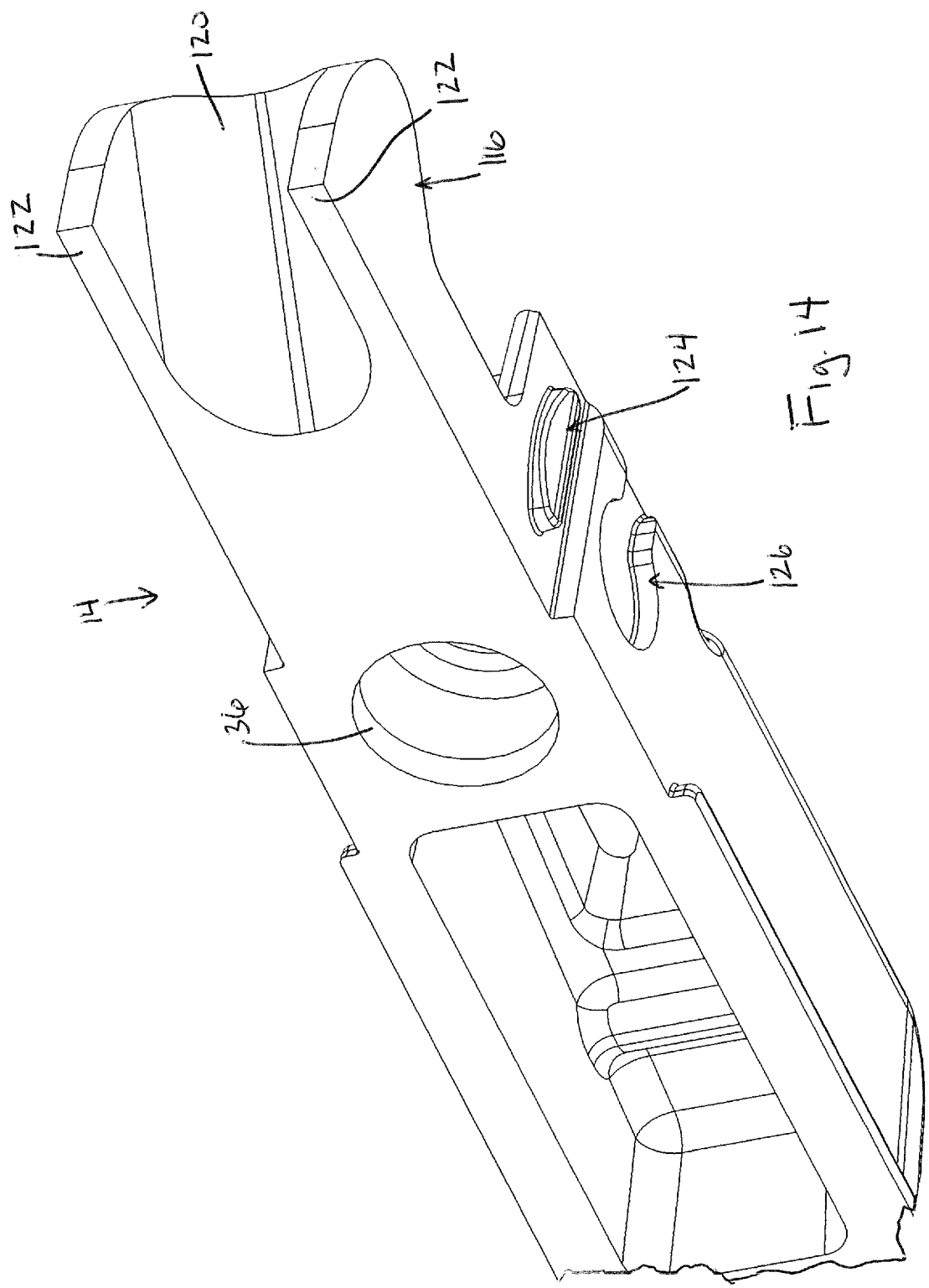
Figure 17:
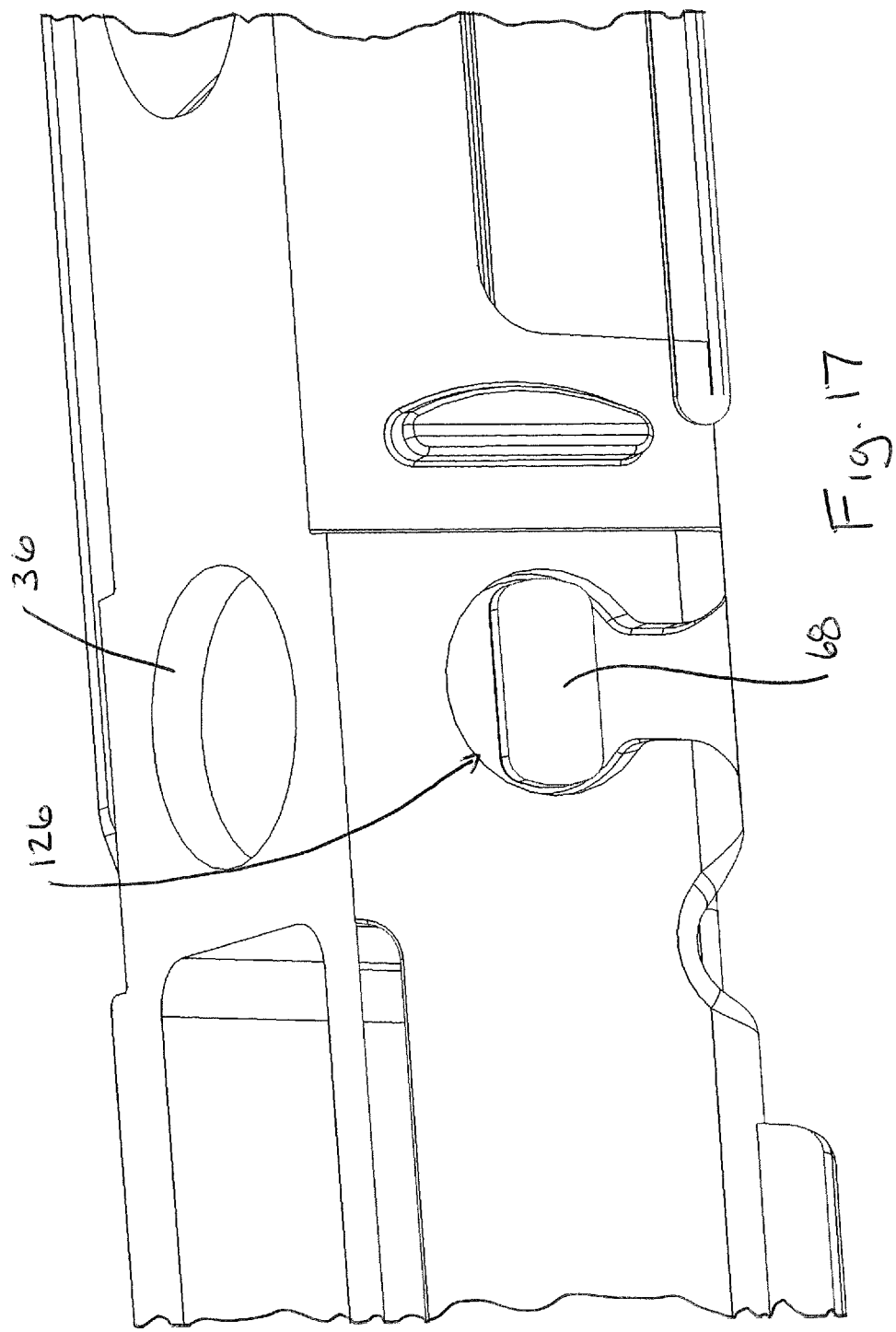
FIG. 17 shows a perspective cross-section to see the pivot connection with the toggle nut in the install orientation.
Figure 18:
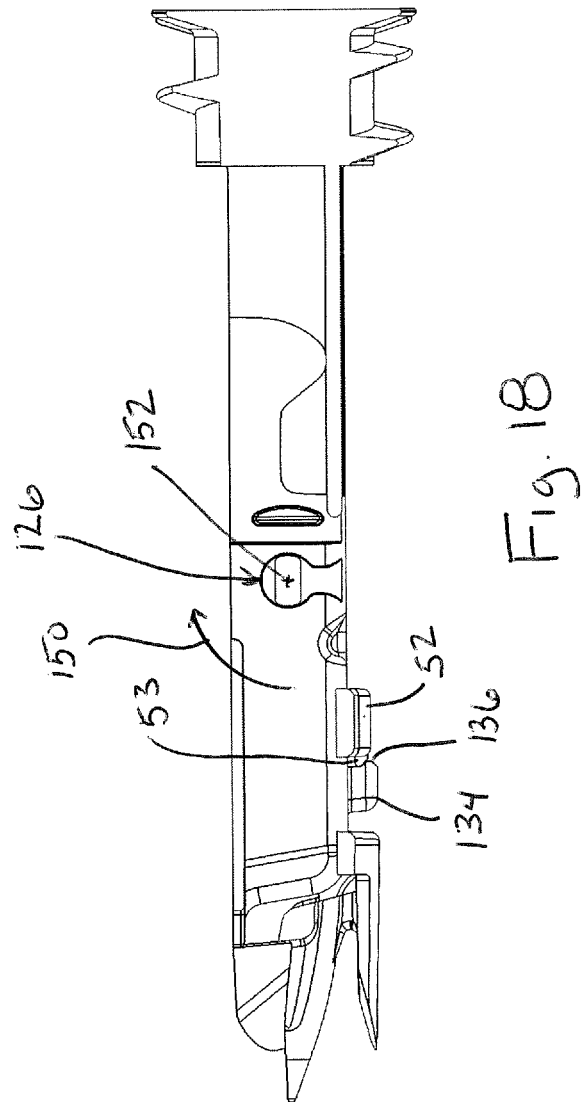
FIG. 18 shows a side cross-section with toggle nut in the install orientation.

When the toggle nut is rotated downward per arrow 26 in FIG. 2, the toggle nut achieves the install orientation of FIG. 3. The side flanges 138 of the toggle nut seat within the recessed upper edge portions 54 of the toggle body arms, such that contact of the side flanges with the recessed edges limits the degree of downward pivot of the toggle nut 14. FIG. 17 shows the relative orientation of each pivot bar 68 within its respective pivot recess 126 when the toggle nut 14 is in the install orientation. In order to releasably retain the toggle nut 14 in the install orientation, the latch finger 134 engages with the forward end of the connecting leg 52, as seen in FIG. 18. As seen in FIGS. 7, 9 and 10, the connecting leg 52 includes a forwardly protruding latch step 53. As shown in FIG. 18, the rearwardly extending segment 136 of the latch finger 134 moves beneath the forwardly protruding latch step 53, providing latching retention. However, the latching retention is only a slight degree that can be overcome by sufficient rotational force applied to the toggle nut in the direction of arrow 150 about the pivot axis 152 that is centered on the main section of the pivot recess 126.

Figure 19:
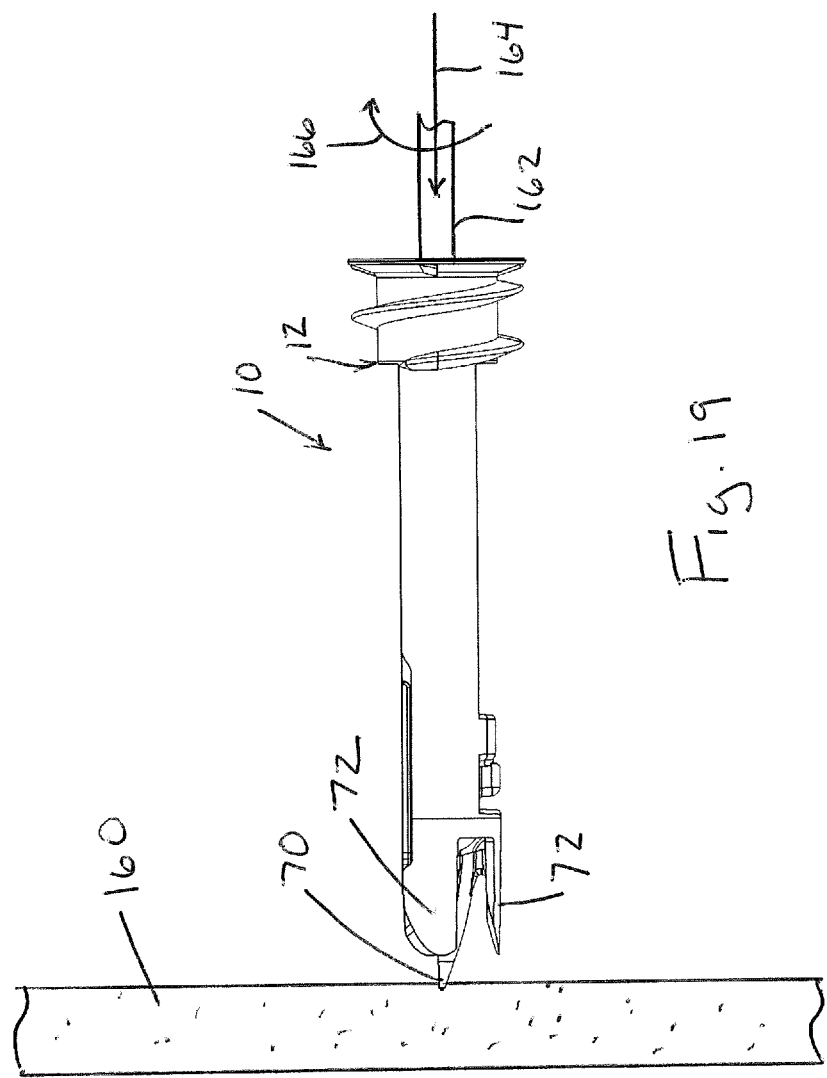
FIGS. 19-22 show a wall install and object mount sequence for the toggle anchor assembly.
Figure 20:
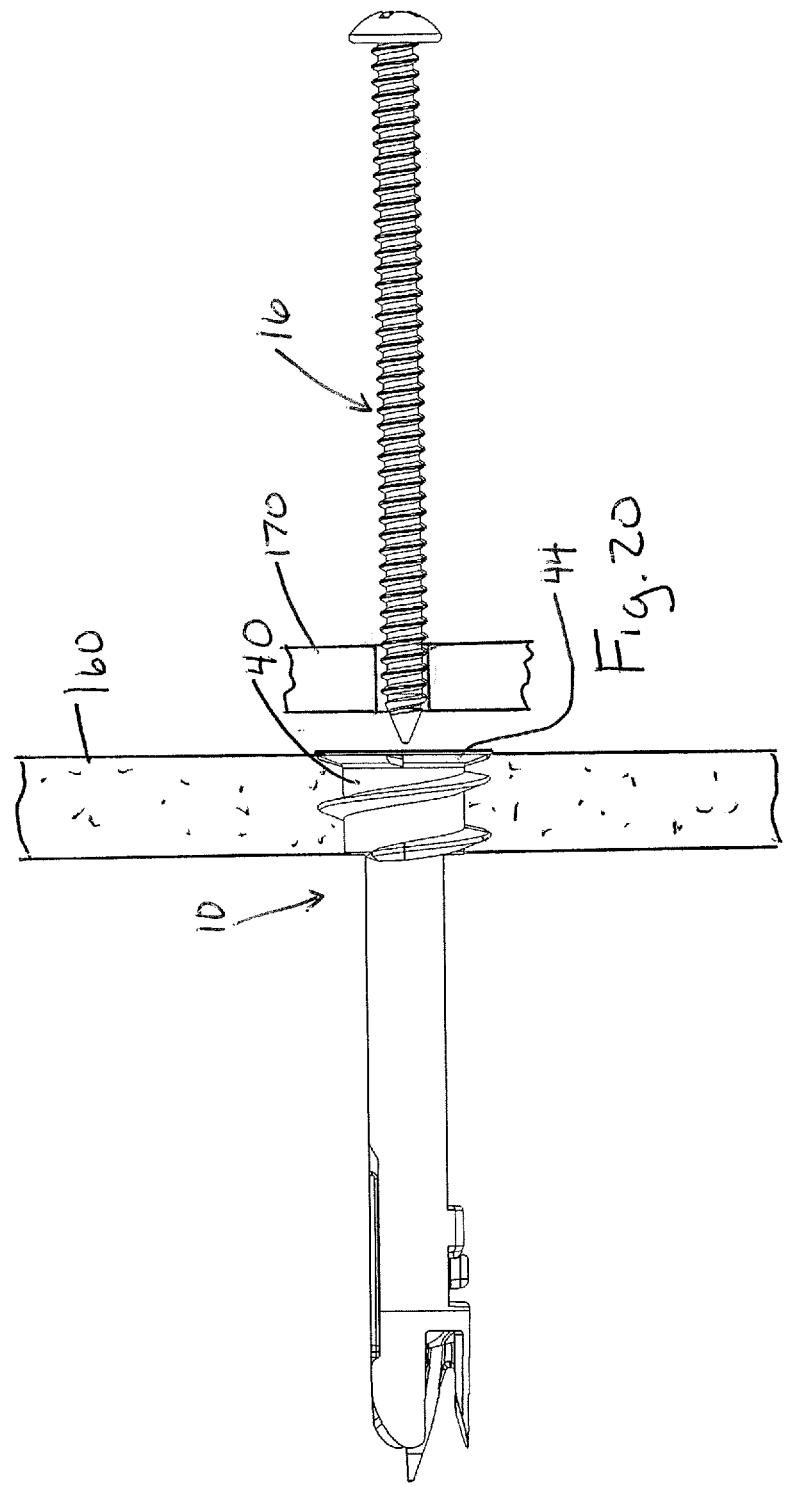
Figure 21:
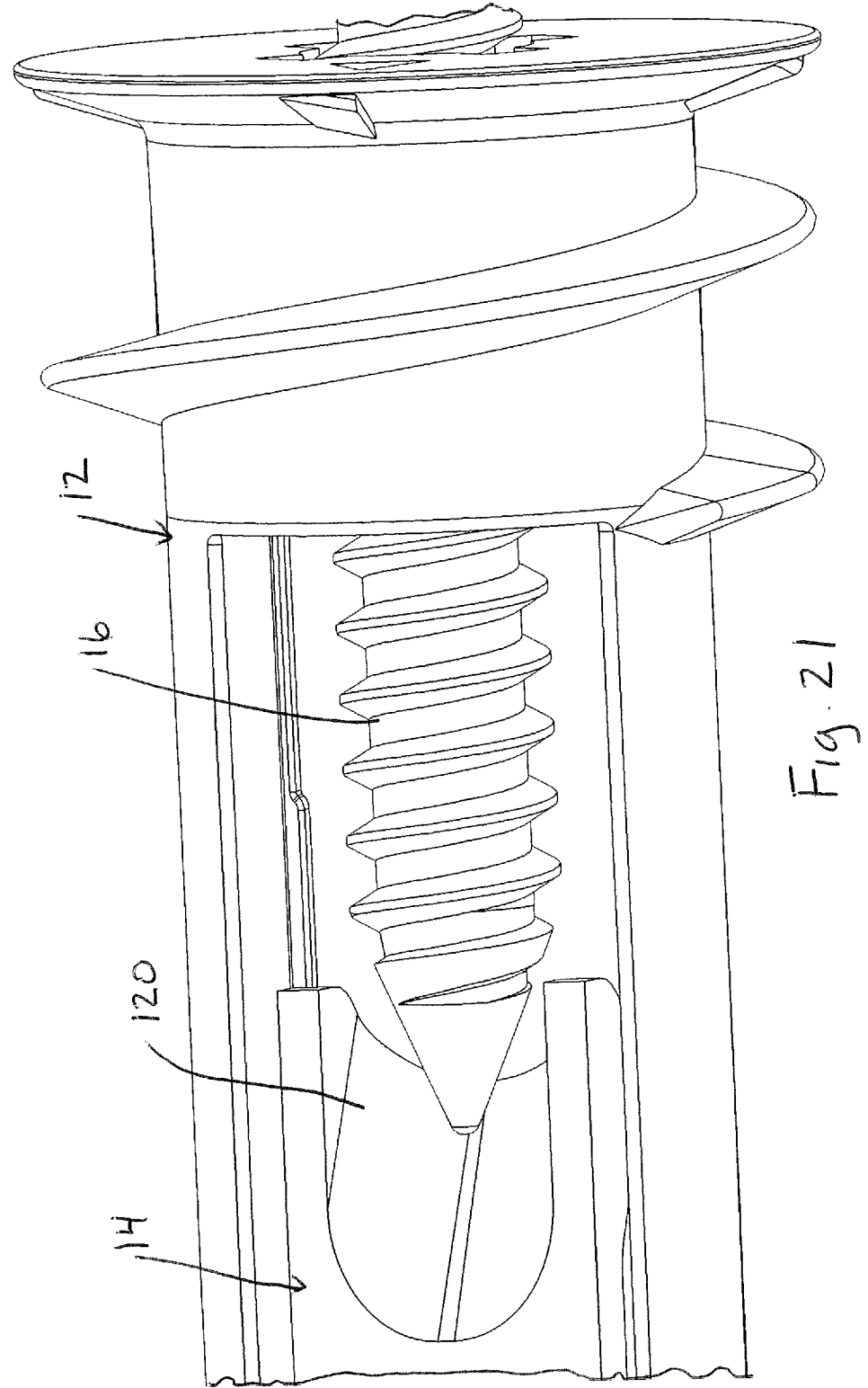
Figure 22:
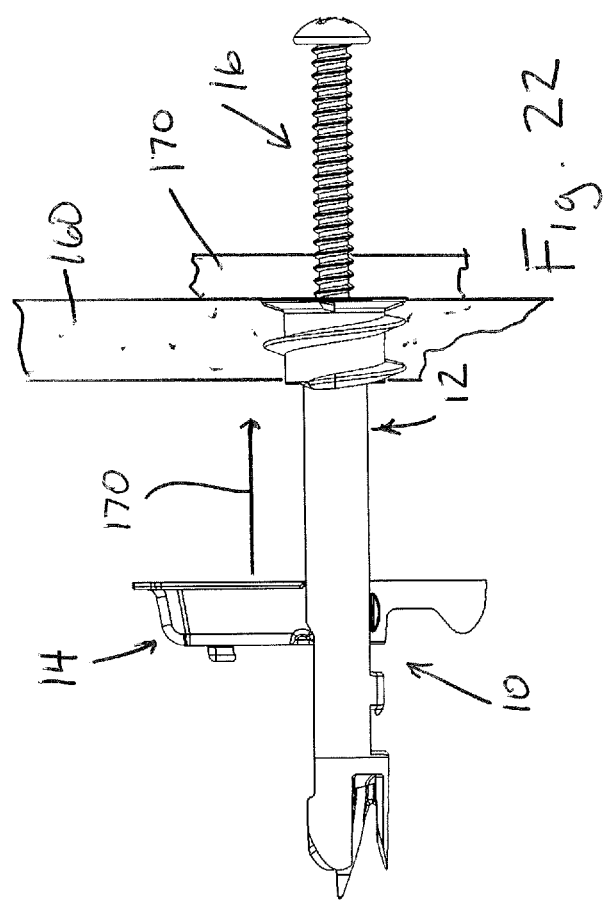

As seen in FIG. 19, to install the anchor 10 into a wall 160, the positioning tip 70 is placed against the surface of the wall 160. A drive member 162 is engaged into the drive recess of the forward end of the toggle body 12 and a force is applied toward the wall per arrow 164, which will cause the positioning tip to begin to penetrate the wall 160. A rotational torque, per arrow 166, is also applied to the anchor 10, which rotation will cause the blade projections 72 to bore a hole through the wall, enabling the anchor to be rotated into a stable and ready position per FIG. 20, where the flange 44 is seated against the wall surface. The size of the hole in the wall corresponds substantially to the size of the cylindrical outer surface of body portion 40, so that the thread 42 engages into the wallboard material of the wall 160 with a good retention property. An object 170 can then be mounted to the wall 160 using the screw 16, by passing the screw through the object and into the anchor 10. As the screw 16 moves further forward along the toggle body 12, the distal tip of the screw contacts the rearward facing ramp surface 120 of the toggle nut, per FIG. 21. The engaged connection between the pivot recess main section 132 and the pivot bar 68 (per FIG. 18) prevents axial movement of the toggle nut 14 along the length of the toggle body 12. Therefore, the interaction between the screw 16 and the ramp surface 120 creates a rotational torque on the toggle nut that will progressively cause the toggle nut to rotate into the upright anchoring orientation so that the screw enters the threaded toggle nut hole 36 as seen in FIG. 5, so that the anchor mounting operation achieves the set-up shown in FIG. 22. As seen in FIG. 15, the bottom of the toggle nut 14 engages with the stop projection 60 of the toggle body 14 to define limit the rotation of the toggle nut during screw entry in order to assure that the toggle nut opening 36 remains aligned to receive the screw. Once the screw 16 is threaded fully into the anchor 10, so that the object 170 is sandwiched between the screw head 17 and the wall 160 as in FIG. 22, further rotation of the screw will pull the toggle nut 14 toward the wall per arrow 172 until the flat top side of the toggle nut is tightly engaged against the rear surface of the wall 160 for final install. This orientation of the toggle nut at final install provides a strong force against pull-out of the anchor 10 from the wall 160.

Figure 23:
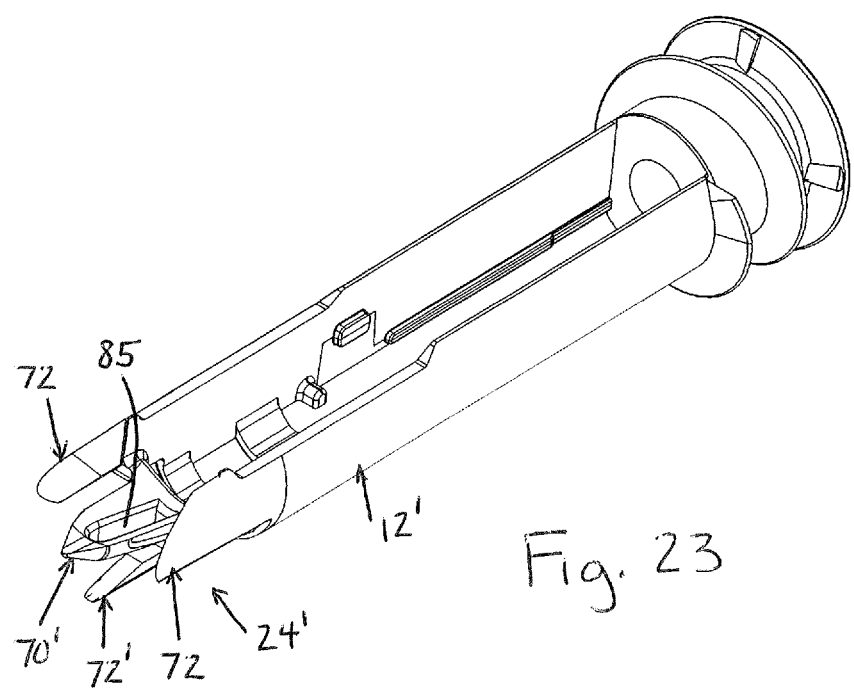
FIGS. 23-25 show an alternative embodiment of a toggle body for the anchor assembly.
Figure 24:
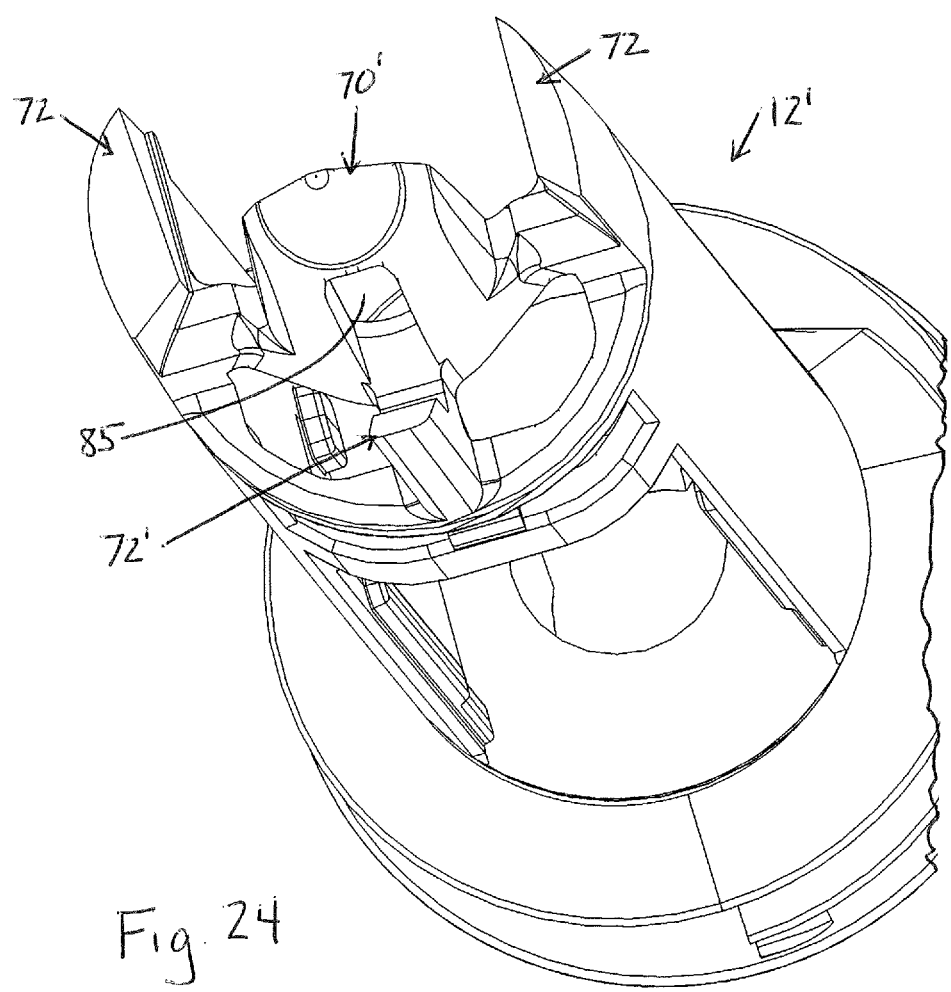
Figure 25:
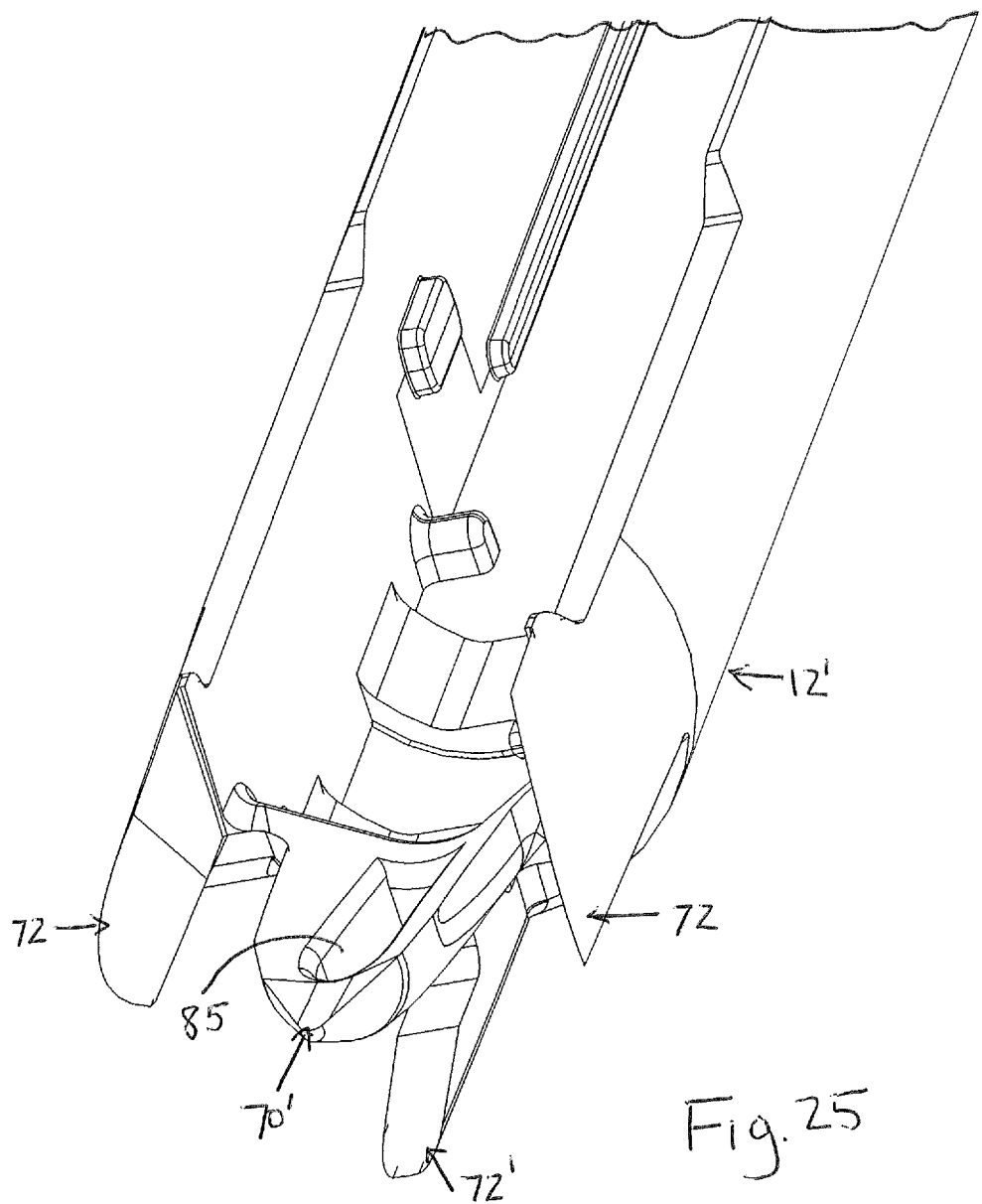

It is to be clearly understood that the above description is intended by way of illustration and example only, is not intended to be taken by way of limitation, and that other changes and modifications are possible. For example, FIGS. 23-25 show an alternative embodiment of a toggle body 12' that is similar in many respects to toggle body 12, but with a variation at the wall boring end 24'. In particular, the positioning tip 70' is formed with an elongated through slot

85 aligns with a central blade projection 72', where the extent of the central blade projection 72' circumferentially is smaller than the extents of the side blade projections 72 circumferentially. This configuration, with narrower central blade projection 72' in alignment with the slot 85 facilitates simultaneous molding of the positioning tip 72' and the central blade projection 72'. Still other variations and configurations are possible.

What is claimed is:

1. An anchor assembly for wallboard installation, comprising:
   a toggle body that is elongated along a toggle body axis, the toggle body including opposed first and second arms and a slot between the first and second arms;
   a toggle nut elongated along a toggle nut axis, the toggle nut mounted in the slot of the toggle body for pivot between an install orientation and an anchoring orientation;
   wherein, in the install orientation, the toggle nut axis is substantially parallel to the toggle body axis;
   wherein, in the anchoring orientation, the toggle nut axis is substantially perpendicular to the toggle body axis;
   a pivot connection between the toggle nut and the toggle body, the pivot connection formed at least in part by a first pivot bar and a first pivot recess, wherein the first pivot bar projects into the slot from an inner side of the first arm of the toggle body, wherein the first pivot recess is defined in a first side surface of the toggle nut, wherein the first pivot recess is configured such that, with the first pivot bar positioned within the first pivot recess, the first pivot recess is able to rotate about the first pivot bar when the toggle nut moves between the install orientation and the anchoring orientation;
   wherein, the first pivot recess includes an entry throat through which the first pivot bar cannot pass when the toggle nut is in the install orientation and through which the pivot bar can pass when the toggle nut is in the anchoring orientation.

2. The anchor assembly of claim 1, wherein the pivot connection is formed at least in part by a second pivot bar and a second pivot recess, wherein the second pivot bar projects into the slot from an inner side of the second arm of the toggle body, wherein the second pivot recess is defined in a second side surface of the toggle nut.

3. The anchor assembly of claim 1, wherein the toggle body includes a connecting leg along a lower portion of the slot and that extends between the first and second arms, wherein the toggle nut includes a latch finger that engages with the connecting leg, when the toggle nut is in the install orientation, to releasably retain the toggle nut in the install orientation.

4. The anchor assembly of claim 1, wherein the toggle body includes a driving end and a wall boring end, wherein the first arm of the toggle body includes a first guide rail projecting into the slot and the second arm of the toggle body includes a second guide rail projecting into the slot, wherein the toggle nut includes a first slide projection for engaging with a top of the first guide rail when the toggle nut is in the anchor orientation and moves toward the driving end of the toggle body, wherein the toggle nut includes a second slide projection for engaging with a top of the second guide rail when the toggle nut is in the anchor orientation and moves toward the driving end of the toggle body.

5. The anchor assembly of claim 4, wherein the first slide projection includes a convex surface that engages the first guide rail and the second slide projection includes a second convex surface that engages the second guide rail.

6. An anchor assembly for wallboard installation, comprising:
   a toggle body that is elongated along a toggle body axis, the toggle body including opposed first and second arms and a slot between the first and second arms;
   a toggle nut elongated along a toggle nut axis, the toggle nut mounted in the slot of the toggle body for pivot between an install orientation and an anchoring orientation;
   wherein, in the install orientation, the toggle nut axis is substantially parallel to the toggle body axis;
   wherein, in the anchoring orientation, the toggle nut axis is substantially perpendicular to the toggle body axis;
   a pivot connection between the toggle nut and the toggle body, the pivot connection formed at least in part by a first pivot bar and a first pivot recess, wherein the first pivot bar projects into the slot from an inner side of the first arm of the toggle body, wherein the first pivot recess is defined in a first side surface of the toggle nut, wherein the first pivot recess is configured for rotation about the first pivot bar when the toggle nut moves between the install orientation and the anchoring orientation;
   wherein the toggle body includes a forward wall boring end formed by a positioning tip and a set of blade projections disposed about the positioning tip, wherein each blade projection includes a forward cutting edge, wherein the positioning tip is formed by a body with a convex surface portion and a concave surface portion.

7. An anchor assembly for wallboard installation, comprising:
   a toggle body that is elongated along a toggle body axis, the toggle body including opposed first and second arms and a slot between the first and second arms;
   a toggle nut elongated along a toggle nut axis, the toggle nut mounted in the slot of the toggle body for pivot between an install orientation and an anchoring orientation;
   wherein, in the install orientation, the toggle nut axis is substantially parallel to the toggle body axis;
   wherein, in the anchoring orientation, the toggle nut axis is substantially perpendicular to the toggle body axis;
   wherein the toggle body includes a forward wall boring end formed by a positioning tip and a set of blade projections disposed about the positioning tip, wherein each blade projection includes a forward cutting edge, wherein the positioning tip is formed by a body with a convex surface portion and a concave surface portion;
   wherein the positioning tip includes an elongated through slot and one of the blade projections aligns with the elongated through slot.

8. An anchor assembly for wallboard installation, comprising:
   a toggle body that is elongated along a toggle body axis, the toggle body including opposed first and second arms and a slot between the first and second arms;
   a toggle nut elongated along a toggle nut axis, the toggle nut mounted in the slot of the toggle body for pivot between an install orientation and an anchoring orientation;
   wherein, in the install orientation, the toggle nut axis is substantially parallel to the toggle body axis;
   wherein, in the anchoring orientation, the toggle nut axis is substantially perpendicular to the toggle body axis;
   a pivot connection between the toggle nut and the toggle body, the pivot connection formed at least in part by a first pivot bar and a first pivot recess, wherein the first pivot bar projects into the slot from an inner side of the first arm of the toggle body, wherein the first pivot recess is defined in a first side surface of the toggle nut, wherein the first pivot recess is configured for rotation about the first pivot bar when the toggle nut moves between the install orientation and the anchoring orientation;

wherein the toggle body includes a forward wall boring end formed by a positioning tip and first, second and third blade projections disposed about the positioning tip, wherein the first blade projection is formed at a forward end of the first arm, the second blade projection is formed at a forward end of the second arm, and the third blade projection extends forwardly from a connecting leg that extends between the first arm and the second arm.

9. The anchor assembly of claim 8, wherein the positioning tip extends forwardly from the connecting leg and is not connected to the first blade projection or the second blade projection.

10. An anchor assembly for wallboard installation, comprising:
a toggle body that is elongated along a toggle body axis, the toggle body including opposed first and second arms and a slot between the first and second arms, the toggle body further including a rear driving end and a forward wall boring end;
a toggle nut elongated along a toggle nut axis, the toggle nut mounted in the slot of the toggle body for pivot between an install orientation seated in the slot and an anchoring orientation protruding from the slot;
wherein the toggle body includes a connecting leg along a lower portion of the slot and that extends between the first and second arms, the connecting leg positioned at a location axially spaced from both the rear driving end and the forward wall boring end, wherein the toggle nut includes a latch finger, wherein a part of the latch finger engages with and is captured beneath a part of the connecting leg, when the toggle nut is in the install orientation, to releasably retain the toggle nut in the install orientation with a latching retention force that acts to inhibit movement of the toggle nut toward the anchoring orientation.

11. The anchor assembly of claim 10, wherein the toggle body includes a driving end and a wall boring end, wherein, when the toggle nut is in the install orientation, the part of the latch finger is formed by a latch segment that protrudes rearwardly toward the driving end of the toggle body and the part of the connecting leg is formed by a latch step that protrudes forwardly toward the wall boring end of the toggle body, and the latch segment is captured at least partly beneath the latch step.

12. The anchor assembly of claim 10, wherein the first arm includes a first recessed upper edge portion and the second arm includes a second recessed upper edge portion, wherein the toggle nut includes a first side flange and a second side flange, wherein, when the toggle nut is in the install orientation, the first side flange seats within the first recessed upper edge portion and the second side flange seats within the second recessed upper edge portion.

13. The anchor assembly of claim 10, further comprising a pivot connection between the toggle nut and the toggle body, the pivot connection formed at least in part by a first pivot bar and a first pivot recess, wherein the first pivot bar projects into the slot from an inner side of the first arm of the toggle body, wherein the first pivot recess is defined in a first side surface of the toggle nut.

14. The anchor assembly of claim 10, wherein the forward wall boring end is formed by a positioning tip and a set of blade projections disposed about the positioning tip, wherein each blade projection includes a forward cutting edge, wherein the positioning tip is formed by a body with a convex surface portion and a concave surface portion.

15. An anchor assembly for wallboard installation, comprising:
a toggle body that is elongated along a toggle body axis, the toggle body including opposed first and second arms and a slot between the first and second arms;
a toggle nut elongated along a toggle nut axis, the toggle nut mounted in the slot of the toggle body for pivot between an install orientation and an anchoring orientation;
wherein, in the install orientation, the toggle nut axis is substantially parallel to the toggle body axis;
wherein, in the anchoring orientation, the toggle nut axis is substantially perpendicular to the toggle body axis;
a pivot connection between the toggle nut and the toggle body, the pivot connection formed at least in part by a first pivot bar and a first pivot recess, wherein the first pivot bar projects into the slot from an inner side of the first arm of the toggle body, wherein the first pivot recess is defined in a first side surface of the toggle nut, wherein the first pivot recess is configured for rotation about the first pivot bar when the toggle nut moves between the install orientation and the anchoring orientation;
wherein, the first pivot recess includes a main section and a narrowed entry throat, wherein the first pivot bar is configured such that (i) when the toggle nut is in the install orientation, the pivot bar is orientated such that it cannot pass through the narrowed entry throat and (ii) when the toggle nut is in the anchoring orientation, the pivot bar is oriented such that it can pass through the narrowed entry throat.

16. An anchor assembly for wallboard installation, comprising:
a toggle body that is elongated along a toggle body axis, the toggle body including opposed first and second arms and a slot between the first and second arms, and a forward wall boring end;
a toggle nut elongated along a toggle nut axis between a forward end and a rearward end, the toggle nut mounted in the slot of the toggle body for pivot between an install orientation and an anchoring orientation;
wherein, in the install orientation, the toggle nut axis is substantially parallel to the toggle body axis;
wherein, in the anchoring orientation, the toggle nut axis is substantially perpendicular to the toggle body axis;
wherein the forward wall boring end of the toggle body includes a positioning tip and a set of blade projections disposed about the positioning tip, wherein each blade projection includes a forward cutting edge;
wherein the forward end of the toggle nut includes a flat top side that is formed at least in part by a first side flange, a second side flange and a forward flange running laterally across a width of the toggle nut and interconnecting the first side flange and the second side flange, the forward flange having a forward end that defines a laterally running serrated edge with a plurality of teeth running laterally across the width of the toggle nut, wherein, when the toggle nut is in the install orientation, the teeth are positioned rearwardly of the forward cutting edges of the blade projections for engaging with a wallboard paper slug that is cut by the blade projections during rotation of the anchor assembly for purpose of installation.

17. The anchor assembly of claim 16, wherein the plurality of teeth are formed by a sequence of triangular serrations.

18. An anchor assembly for wallboard installation, comprising:
- a toggle body that is elongated along a toggle body axis, the toggle body including opposed first and second arms and a slot between the first and second arms;
- wherein the toggle body includes a forward wall boring end formed by a positioning tip and a set of blade projections disposed about the positioning tip, wherein each blade projection includes a forward cutting edge, wherein the positioning tip includes an elongated through slot and one of the blade projections aligns with the elongated through slot.

\* \* \* \* \*